May 3, 1955

A. SMAIL 2,707,427

DEVICES FOR BREWING OR INFUSING TEA AND LIKE BEVERAGES

Filed Aug. 30, 1952

Inventor
Alexander Smail
By:
Haseltine, Lake & Co.
Agents

United States Patent Office 2,707,427
Patented May 3, 1955

2,707,427

DEVICES FOR BREWING OR INFUSING TEA AND LIKE BEVERAGES

Alexander Smail, Virginia Water, England, assignor to The Teasy Kettle Company Limited, London, England, a British company Application August 30, 1952, Serial No. 307,200

Claims priority, application Great Britain September 3, 1951

4 Claims. (Cl. 99—290)

This invention relates to apparatus for brewing or infusing tea or like beverages.

According to the invention, the apparatus comprises a vessel adapted to hold a body of water, a chamber or compartment in communication with the interior of the vessel, a container adapted to be disposed within said chamber or compartment and to hold a supply of tea or other substance and means whereby on tilting of the vessel, a proportion of the water therein will be caused to flow into said chamber or compartment and through the substance in the container to an outlet while a further selected proportion may be caused to flow from said vessel, by passing said container, and directly to a point adjacent said outlet so that it will dilute the beverage issuing from the latter.

In order that the invention may be clearly understood and readily carried into effect, the same will now be more fully described with reference to the accompanying drawings, which show one embodiment by way of example, and in which.

Figure 1:
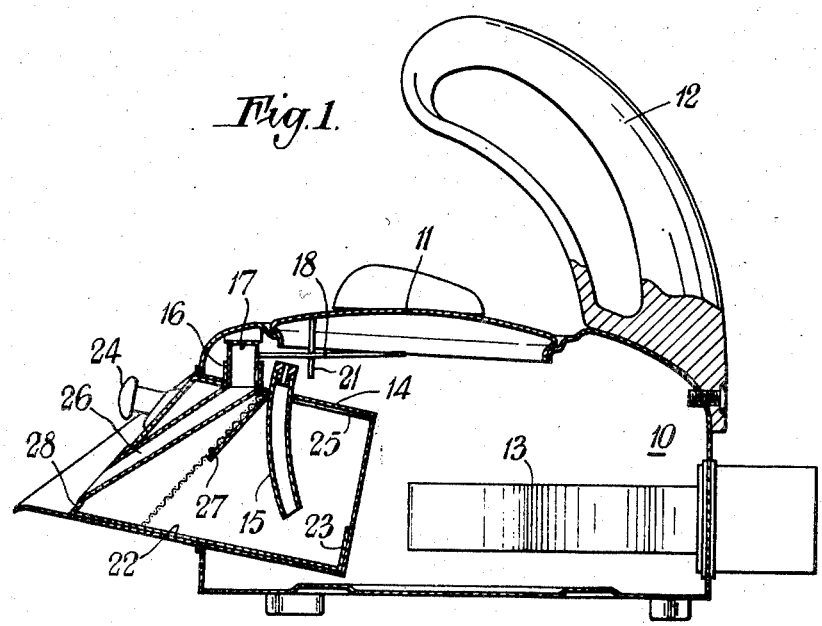
Figure 1 is a cross sectional view through a kettle incorporating a beverage infusing or brewing device.
Figure 2:
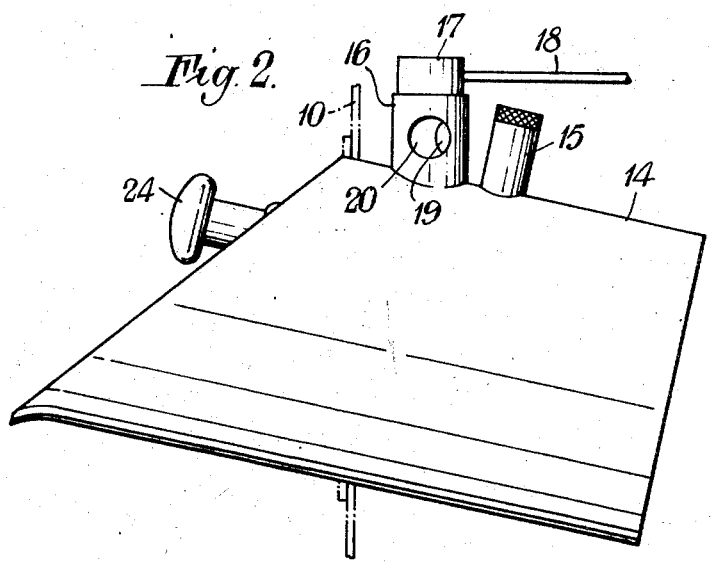
Figure 2 is a side elevational view of the device.

Referring now to the drawings, 10 denotes a kettle which in conformity with general practice is provided with a lid 11 and a handle 12. 13 denotes an electric heating element of known type. In place of the normal spout, a cylindrical insert 14 is introduced into the body of the kettle and fixedly mounted in position therein, such insert being closed at its inner end and so formed at its open outer end as to provide the equivalent of a pouring spout or lip. Mounted on the insert, which is inclined to the horizontal, is a pipe 15 which extends from a point above said insert downwardly into the interior of the latter. The insert is also formed with an upstanding bush or collar 16 adapted to provide a seating for a valve member 17 having an operating or control arm 18 associated therewith. The valve member 17 is formed with an aperture 19 which on angular movement of the arm 18 and hence of said member 17 may be brought into or out of register with an aperture 20 in the bush or collar 16, thereby to control the passage of water from the interior of the kettle and through said bush or collar. In the embodiment illustrated, angular movement of the arm 18, to effect adjustment of the valve member 17, is effected through the medium of the lid 11, the latter being provided at its underside with a pair of downwardly directed projections 21 which are spaced apart so that on application of the lid 11 to the kettle, said arm 18 will be located between said projections. It will be appreciated that angular movement of the lid 11 will thus result in a corresponding angular movement of the arm 18 and hence of the valve member 17.

The insert 14 is adapted to receive a cylindrical container 22 which is so dimensioned relatively to said insert that while it is capable of being readily introduced into and withdrawn from the latter, it is nevertheless a sufficiently good fit therein that it will not slide out of position when the kettle is tilted. If desired, a readily releasable locking device may be incorporated to retain the container 22 in position within the insert 14 or said container may be so formed that it will possess a degree of resilience, such as will serve to exert a gripping or binding action on the interior of the insert. The container 22, which is partially closed at its inner end by means of a wall portion 23, is closed at its outer end and mounted on the outer face of said outer end wall is a handle 24 whereby said container may be manipulated into and out of position within the insert 14. At its upper part, the container 22 is formed with a longitudinally extending slot 25 which extends from the inner end thereof for a distance sufficient to accommodate the pipe 15 and to allow the container to be pushed fully home into the insert. Also disposed within said container is a pipe 26 which leads from the upper surface of the container to an aperture in the outer end wall thereof and is adapted when the container is in position in the insert 14 to register with the bush or collar 16 and to provide a direct communication between the latter and exterior of the kettle. It will be appreciated that the pipe 26 does in fact by-pass the container 22 and provide for a direct flow of water from the interior to the exterior of the kettle on appropriate manipulation of the valve member 17 and also on appropriate tilting of the kettle. 27 denotes a screen or grid which is formed of wire mesh or perforated metal and is fixedly mounted in position within the container 22. 28 denotes an outlet on the outer end wall of the container, such outlet allowing passage of liquid from the interior of said container on appropriate tilting of the kettle.

When the device above described is to be used for tea making, the kettle is filled with water to the required level, which should be below the upper end of the pipe 15. An appropriate amount of tea is placed in the body of the container 22 which is thereafter pushed into the insert 14. The valve member 17 is moved by virtue of suitable manipulation of the lid 11 to a position wherein the aperture 19 is out of register with the aperture 20, so that no flow of water can take place through the bush or collar 16 and the pipe 26. The supply of power to the heating element 13 is then switched on and when the water boils, the kettle is tilted to cause a small amount of water to pass through the pipe 15 and onto the tea within the container 22. When the coloured brew issues from the outlet 28, the kettle is restored to its initial position for a selected period e. g. some minutes, to allow infusion of the tea by the water still present within the container. When the period for infusion has elapsed the valve member 17 is adjusted by appropriate angular movement of the lid 11 to bring the aperture 19 wholly or partially into register with the aperture 20 and the kettle is then tilted to effect pouring of the beverage into a cup or other vessel. It will be appreciated that strong tea will issue from the aperture 28 while pure water will issue from the pipe 26 and that by suitable manipulation of the valve member 17, the strength of the beverage actually poured into the cup or vessel may be varied to suit individual requirements. Preferably the lid 11 and the adjacent portion of the kettle body will be provided with a cooperating scale and pointer which will indicate the appropriate setting of the lid and hence of the valve member to produce a beverage of any selected strength.

It may be feasible by appropriate dimensioning and/or positioning of the pipe 15 or by the incorporation of an additional pipe to arrange for a predetermined amount of boiling water to enter the container 22 automatically thereby initially to effect infusion or brewing of the tea. With such an arrangement the necessity for an initial tilting of the kettle such as is called for in the process outlined above would be obviated but of course tilting would be required to effect pouring of the beverage into a cup or other vessel.

If desired, a transverse rib or wall may be incorporated within the lower part of the container 22 at a point adjacent the outer end thereof in order to provide a weir or baffle which will impede the flow of liquid from said container and through the outlet 28 and will ensure that a predetermined amount of water will be present within said container. Again, instead of operating the valve member 17 in the manner above described, it may be desirable to provide said valve member with an operating rod which is adapted to project through the wall of the kettle and carries an operating knob or handle at its outer end by manipulation of which latter adjustment of said valve member may be effected. Furthermore, instead of the valve means above described and illustrated, any type of valve device may be incorporated which will provide for control of the flow of water through the pipe 26. Finally, it will be appreciated that the device may be applied to any type of kettle, whether electrically heated or not, or to any other vessel or container capable of use for the boiling of water.

I claim:

1. Apparatus for brewing tea and like beverages comprising a vessel for holding a body of water, a sleeve like insert fitted in said vessel and projecting partially therefrom, said insert being closed at its inner end and open at the outer end to form an outlet spout for said vessel, a first passage providing open communication between the interior of said vessel and said sleeve like insert, said first passage opening into said vessel at a point above the normal maximum level of water therein, a container removably positioned within said insert to hold a supply of a substance from which the beverage is to be brewed, a second passage leading from the interior of the vessel to a point adjacent the open end of said insert and a valve located in said second passage, the first passage being located so that the water is caused to flow, by the tilting of said vessel, via said first passage into the insert wherein the water contacts said substance in the container, the resultant beverage issuing from the open end of said insert at which point it is controllably diluted by water supplied directly from the said vessel via said second passage, the control of the dilution resulting from the operation of said valve.

2. Apparatus for brewing tea and like beverages comprising a vessel adapted to hold a body of water, a sleeve like insert introduced into said vessel to project partially therefrom, said insert being closed at its inner end and open at the outer to form an outlet spout for said vessel, a first passage providing communication between the interior of said vessel and said insert, said passage opening into said vessel at a point above the normal maximum level of water therein, a second passage also providing communication between the interior of said vessel and said insert, a container adapted to be removably positioned in said insert and to hold a supply of a substance from which the beverage is to be brewed, a conduit incorporated in said container and adapted on introduction of said container into said insert to register at one end with said second passage and to open at the other end at a point adjacent the open end of the insert and a valve located in said second passage to control the flow of water therethrough, the arrangement being such that with the vessel full of water and the container in position within the insert, tilting of said vessel will cause water to flow via said first passage into the insert wherein it will contact the substance in the container the resultant beverage issuing from the open end of said insert at which point it may, on operation of the valve, be diluted by water supplied directly from the interior of the vessel via said second passage and the conduit in said container.

3. Apparatus for brewing tea and like beverages comprising a vessel adapted to hold a body of water, a removable closure member for said vessel, a sleeve like insert introduced into said vessel to project partially therefrom, said insert being closed at its inner end and open at the outer to form an outlet spout for said vessel, a first passage providing communication between the interior of said vessel and said insert, said passage opening into the vessel at a point above the normal maximum level of water therein, a second passage also providing communication between the interior of said vessel and said insert, a container adapted to be removably positioned in said insert and to hold a supply of a substance from which the beverage is to be brewed, a conduit incorporated in said container and adapted on introduction of said container into said insert to register at one end with said second passage and to open at the other end at a point adjacent the open end of said insert, a valve located in said second passage, an actuating arm associated with said valve and means associated with the aforesaid removable closure adapted on application of the latter to said vessel to co-operate with said arm so that angular movement of said closure will result in operation of the valve, the arrangement being such that with the vessel full of water, the closure applied to said vessel and the container in position within the insert tilting of said vessel will cause water to flow via said first passage and into the insert wherein it will contact the substance in the container, the resultant beverage issuing from the open end of said insert at which point it may, on manipulation of the closure and consequent actuation of the valve, be diluted by water supplied directly from the interior of the vessel via said second passage and the conduit in said container.

4. Apparatus as claimed in claim 3 and wherein a perforated screen is incorporated in the container to retain the substance therein, the said conduit being disposed on the outlet side of said perforated screen.

References Cited in the file of this patent

UNITED STATES PATENTS

| | | |
|---|---|---|
| 39,115 | Bristol | July 7, 1863 |
| 120,936 | Robinson et al. | Nov. 14, 1871 |
| 1,389,239 | Calkin | Aug. 30, 1921 |

FOREIGN PATENTS

| | | |
|---|---|---|
| 3,855 | Great Britain | 1911 |
| 6,749 | Great Britain | 1835 |
| 275,745 | Great Britain | Aug. 18, 1927 |